(12) United States Patent
Krolnik et al.

(10) Patent No.: US 10,688,845 B2
(45) Date of Patent: Jun. 23, 2020

(54) COOLING PACKAGE FOR A MACHINE

(71) Applicant: Caterpillar Paving Products Inc., Brooklyn Park, MN (US)

(72) Inventors: Andrew James Krolnik, Brooklyn Park, MN (US); Thomas Michael Halt, Henderson, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 53 days.

(21) Appl. No.: 16/101,595

(22) Filed: Aug. 13, 2018

(65) Prior Publication Data

US 2020/0047584 A1 Feb. 13, 2020

(51) Int. Cl.
| | | |
|---|---|---|
| *F28D 1/00* | (2006.01) | |
| *B60H 1/00* | (2006.01) | |
| *F01P 1/00* | (2006.01) | |
| *F01P 5/02* | (2006.01) | |

(52) U.S. Cl.
CPC ..... *B60H 1/00521* (2013.01); *B60H 1/00464* (2013.01); *F01P 5/02* (2013.01); *F01P 2001/005* (2013.01); *F01P 2070/50* (2013.01); *F01P 2070/52* (2013.01)

(58) Field of Classification Search
CPC ... B60H 1/00521; B60H 1/00464; F01P 5/02; F01P 2001/005; F01P 2070/50; F01P 2070/52; F01K 23/065; F28D 1/024

USPC .......................................................... 165/149
See application file for complete search history.

(56) References Cited

U.S. PATENT DOCUMENTS

| | | | | |
|---|---|---|---|---|
| 4,883,024 A | * | 11/1989 | Ito | ............. F01P 5/02 |
| | | | | 123/41.7 |
| 6,179,043 B1 | | 1/2001 | Betz | |
| 2006/0237175 A1 | | 10/2006 | Hara | |
| 2014/0007575 A1 | * | 1/2014 | Ernst | ..... F01K 23/065 |
| | | | | 60/618 |
| 2014/0311715 A1 | * | 10/2014 | Smith | ...... F01P 5/02 |
| | | | | 165/121 |
| 2017/0295675 A1 | * | 10/2017 | Huang | .... F28D 1/024 |

FOREIGN PATENT DOCUMENTS

EP 0108479 A1 5/1984

* cited by examiner

*Primary Examiner* — Davis D Hwu
(74) *Attorney, Agent, or Firm* — Jeff A. Greene

(57) ABSTRACT

A mounting assembly to mount a cooling fan assembly within a cooling package of a machine, is provided. The cooling package includes an inlet header, an outlet header, and a cooling core having a side extending between the inlet header and the outlet header. The mounting assembly includes a mounting plate coupled to the side of the cooling core. The mounting assembly further includes a mounting bracket coupled to the mounting plate and includes a mounting member for releasably coupling the cooling fan assembly within the cooling package.

15 Claims, 6 Drawing Sheets

COOLING PACKAGE FOR A MACHINE

TECHNICAL FIELD

The present disclosure generally relates to a cooling package for a machine and more particularly, to a mounting assembly for mounting a cooling fan assembly within the cooling package.

BACKGROUND

With increasing capacities and strengths of modern engine systems, there has been an increase in demand for sophisticated cooling systems associated with these engine systems. These high-tech and sophisticated cooling systems require a compact design due to difficult installation conditions of the engine systems. Generally, such cooling systems include a cooling fan assembly, coolant lines, one or more cooling cores, such as air-to-air aftercooler, radiator, hydraulic air cooler, etc. Typically, the cooling package is covered with a shroud to direct airflow, reduce noise and provide safety shield when the cooling fan assembly is operating. The cooling fan assembly may be mounted either external to the shroud or internal to the shroud. However, such mounting structures for mounting the cooling fan and the fan motor within the cooling package are very complex, space intensive and affect the robustness of the cooling package.

US Patent Publication no. 2006237175 (hereinafter referred to as the '175 publication) relates to a heat exchanger for a vehicle. A second portion, in which a shroud is attached to a radiator, is formed at a position shifted from a first attaching portion, at which a condenser is attached to the radiator, at predetermined intervals in a vehicle width direction. Further '175 publication describes that it is possible to prevent the weights of a condenser and the shroud from concentrating upon a root portion of a specific tube via the first and the second attaching portions.

SUMMARY OF THE INVENTION

In one aspect, a mounting assembly to mount a cooling fan assembly within a cooling package of a machine, is provided. The cooling package includes an inlet header, an outlet header and a cooling core having a side extending between the inlet header and the outlet header. The mounting assembly includes a mounting plate coupled to the side of the cooling core. The mounting assembly further includes a mounting bracket coupled to the mounting plate and includes a mounting member for releasably coupling the cooling fan assembly within the cooling package.

In another aspect, a cooling package for a machine is provided. The cooling package includes a first cooling core and a second cooling core stacked together along a plane. The cooling package further includes a cooling fan assembly and a mounting assembly for mounting the cooling fan assembly within the cooling package. The mounting assembly includes a mounting plate coupled between the first cooling core and the second cooling core. The mounting assembly further includes a mounting bracket coupled to the mounting plate and includes a mounting member for releasably coupling the cooling fan assembly within the cooling package.

In a yet another aspect, a machine is provided. The machine includes an engine and a cooling package associated with the engine. The cooling package includes a first cooling core, a second cooling core and a third cooling core stacked together along a plane. The cooling package further includes a cooling fan assembly and a mounting assembly for mounting the cooling fan assembly within the cooling package. The mounting assembly includes a first mounting plate coupled between the first cooling core and the second cooling core, and a second mounting plate coupled between the second cooling core and the third cooling core. The mounting assembly further includes a mounting bracket coupled to the first mounting plate and the second mounting plate. The mounting bracket further includes a mounting member for releasably coupling the cooling fan assembly within the cooling package.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
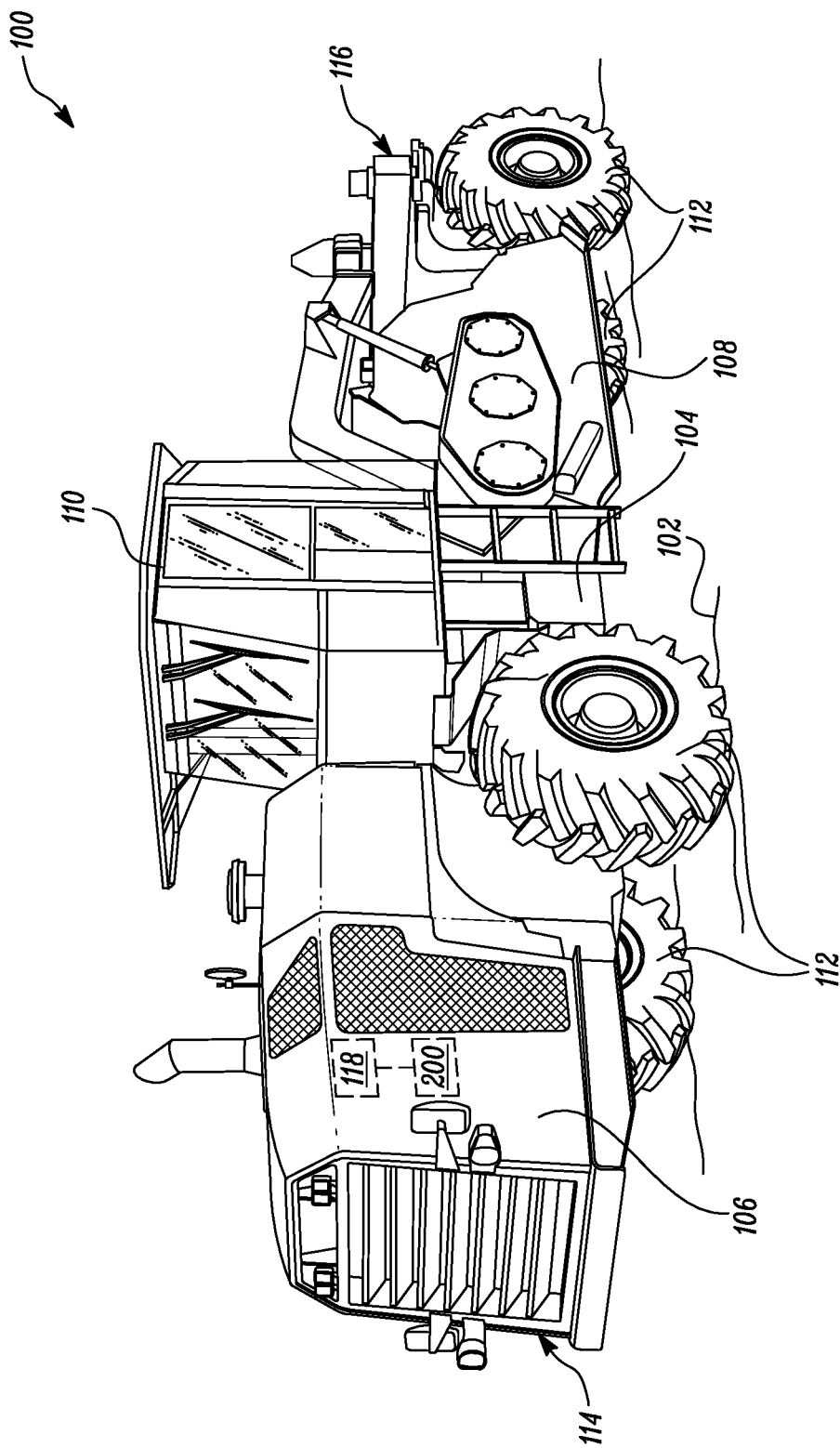
FIG. 1 illustrates an exemplary machine, in accordance with the concepts of the disclosure.

The present disclosure relates to a mounting assembly for mounting a cooling fan assembly within a cooling package of a machine. FIG. 1 illustrates an exemplary machine 100 configured to operate at a work surface 102, according to an embodiment of the present disclosure. The work surface 102 may include a paved or non-paved surface. Other examples of the machine 100 may include, but not limited to, a recycler, a cold planar, or any other miller machine configured to grind or pulverize the work surface 102. The machine 100 may embody other machine types configured to perform other types of operation associated with an industry such as mining, construction, farming, transportation, or any other industry. Such other examples of the machine 100 may include, but not limited to, an off-highway truck, a dump truck, an excavator, or the like. Further, the machine 100 may be a manned machine or an unmanned machine. In some embodiments, the machine 100 may be a machine having a various level of autonomy, such as fully-autonomous machine, a semi-autonomous machine, a remotely operated machine, or a remotely supervised machine.

The machine 100 includes a frame 104, an engine compartment 106, a milling assembly 108, an operator cabin 110, and a plurality of traction units 112. The frame 104 includes a front end 114 and a rear end 116, and acts as a support or mounting structure for various components, systems or assemblies of the machine 100, such as, the engine compartment 106, the milling assembly 108, the operator cabin 110, the traction units 112, and so on.

The engine compartment 106 may be disposed proximate to the front end 114 of the frame 104 and may be coupled to the frame 104. The engine compartment 106 may house an engine 118 of the machine 100. The engine 118 may be configured to power a transmission system (not shown) and various other systems and components of the machine 100 to propel/operate the machine 100 on and along the work surface 102. The traction units 112 may be connected to the frame 104 and configured to receive power from the engine 118 to facilitate machine movement along the work surface 102. Although the traction units 112 are depicted as wheels, it may be understood that other devices, such as crawler tracks, or the like, may also be employed.

The milling assembly 108 may be disposed below the frame 104 and may be coupled to a bottom side of the frame 104. It may be contemplated that the milling assembly 108 may include a milling chamber and a rotor (not shown) disposed within the milling chamber. The rotor may be driven by a drive assembly and may include a plurality of cutting elements mounted on an outer periphery of a rotor drum to grind and/or pulverize the work surface 102. For example, additives may be mixed with the grounded and/or pulverized material, during grinding and/or pulverization, for stabilizing a soil or a layer of the work surface 102. The drive assembly may include a suitable mechanism, such as a chain sprocket arrangement, a belt pully arrangement, a gear assembly, etc., to transfer power from the engine 118 for rotating the rotor.

The frame 104 also supports a cooling package 200 associated with the engine 118 and configured to cool the engine 118 during operations and/or other systems on the machine, such as the operator cabin 110. The cooling package 200 is further explained in greater detail with respect to FIGS. 2 through 6.

Figure 2:
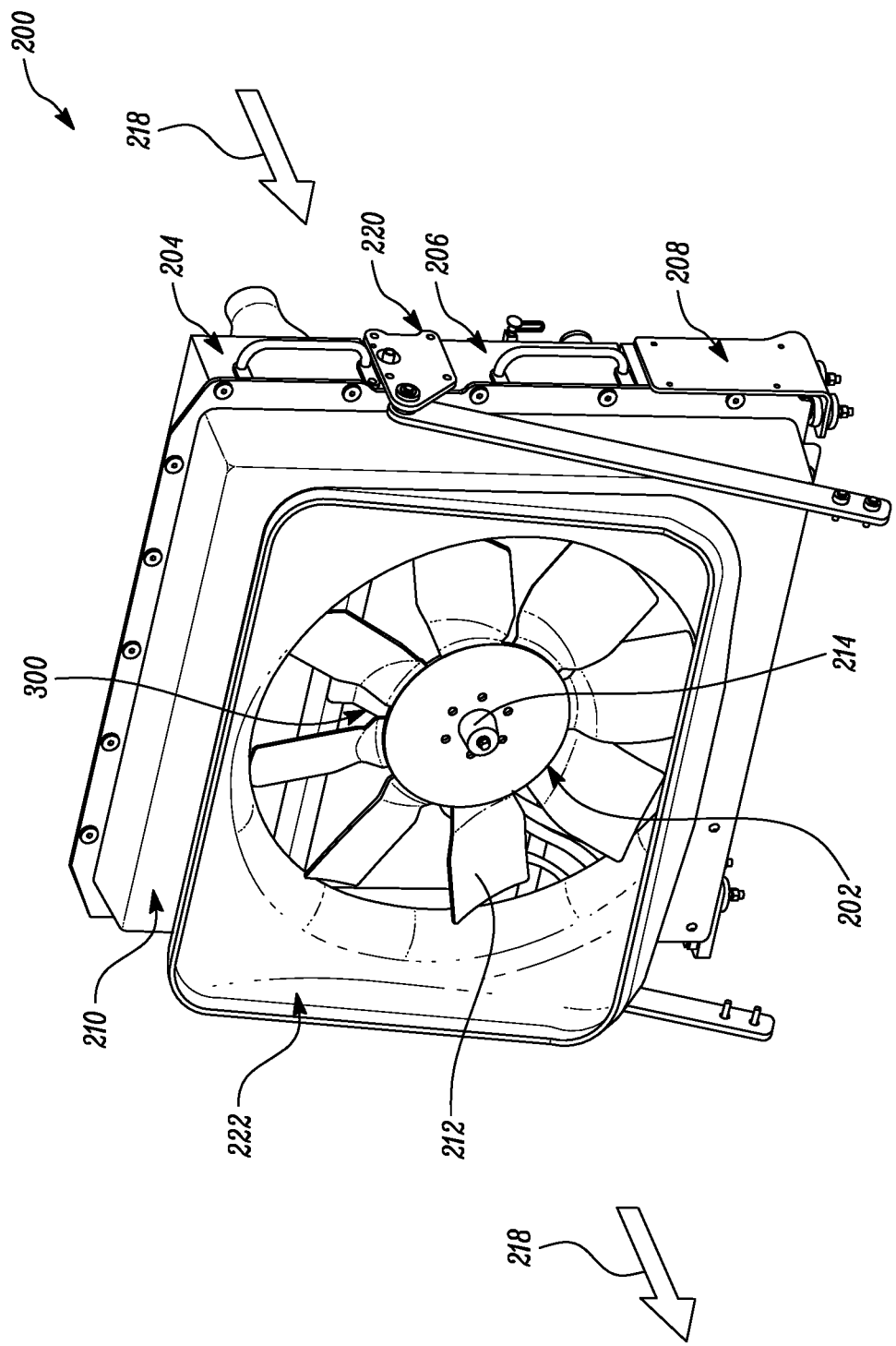
FIG. 2 illustrates a front perspective view of an exemplary cooling package for the machine, in accordance with the concepts of the disclosure.
Figure 3:
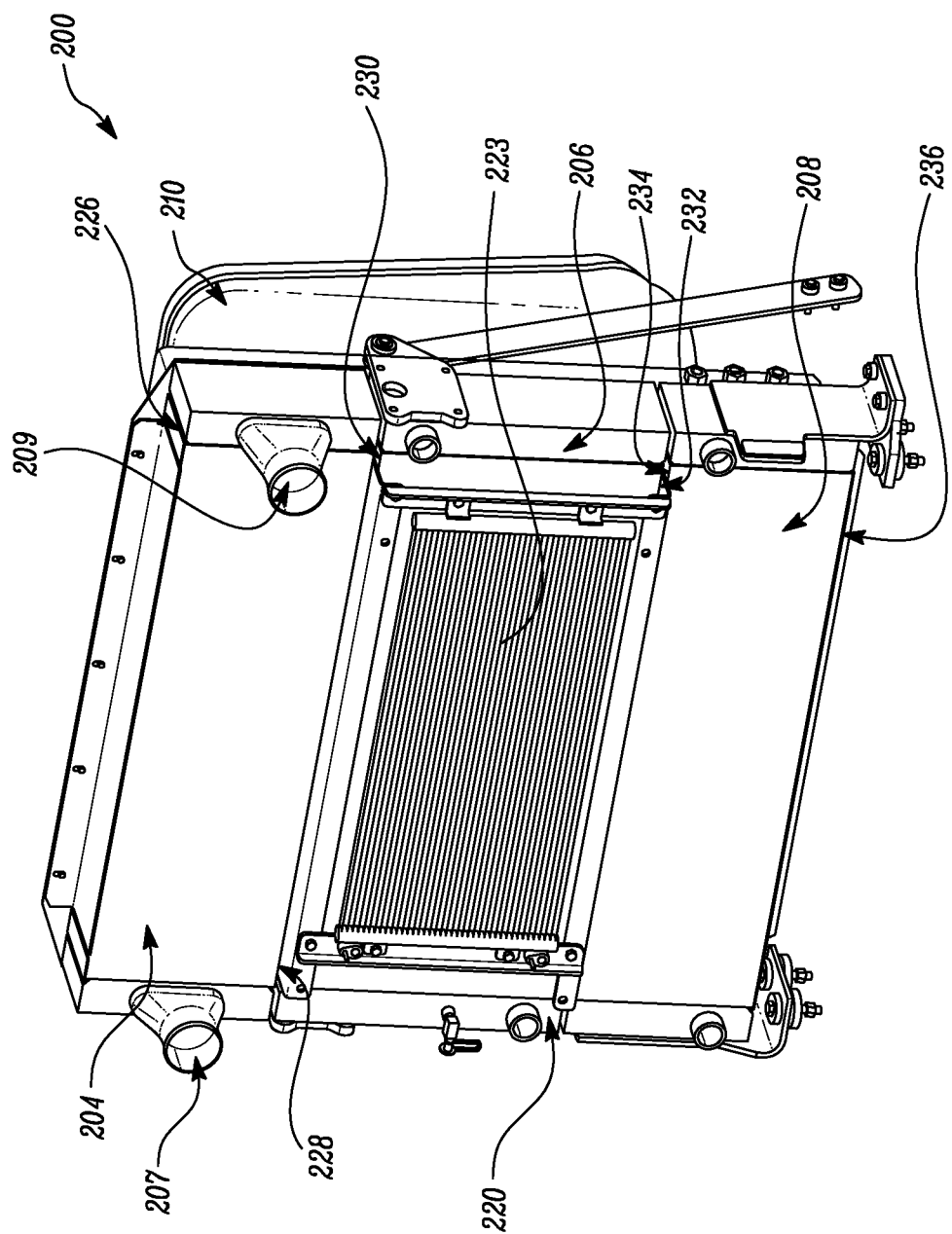
FIG. 3 illustrates a rear perspective view of the cooling package, in accordance with the concepts of the present disclosure.

Referring to FIGS. 2 and 3, the cooling package 200 includes a cooling fan assembly 202, one or more cooling cores, such as a first cooling core 204, a second cooling core 206, and a third cooling core 208, an inlet header 207, an outlet header 209, and a shroud 210. The inlet header 207 and the outlet header 209 facilitate inlet and outlet of a coolant fluid to be circulated through the cooling cores 204, 206, 208. In one example, the cooling package 200 may include common inlet header and outlet header for all the cooling cores. In another example, each cooling core may have a separate inlet header and a separate outlet header. Further, the cooling fan assembly 202 includes a cooling fan 212, a fan adapter 214 and a fan motor 216 (shown in FIG. 6) configured to rotate the fan adapter 214 to operate the cooling fan 212. The cooling fan assembly 202 is configured to facilitate a flow of air (as shown by arrows 218) through the cooling package 200, thereby defining an upstream side 220 and a downstream side 222 of the cooling package 200.

In an embodiment of the present disclosure, the first cooling core 204 may be an Air-to-Air After Cooler (ATAAC), the second cooling core 206 may be a radiator cooling core, and the third cooling core 208 may be a Hydraulic oil cooler. The ATAAC, the radiator and the hydraulic oil cooler are commonly known in the art, and therefore, their detailed working is not provided herein for the sake of brevity of the disclosure. In one example, the cooling cores 204, 206 and 208 may be made up of bars and plates stacked together to make internal and external fluid passages. It may be contemplated that the construction of the cooling cores 204, 206 and 208 is merely exemplary and is not to be considered limiting the scope of the claimed subject matter in any manner. It may be further contemplated that the number and examples of these cooling cores are also merely exemplary and are not to be considered limiting the scope of the claimed subject matter, in any manner. The cooling package 200 may further include a heat exchanger, such as a condenser 223 (shown in FIG. 3). The condenser 223 may serve as a supplementary cooling source for further cooling the engine 118 of the machine 100, or to cool any other device/apparatus of the machine 100, such as the operator cabin 110.

Figure 4:
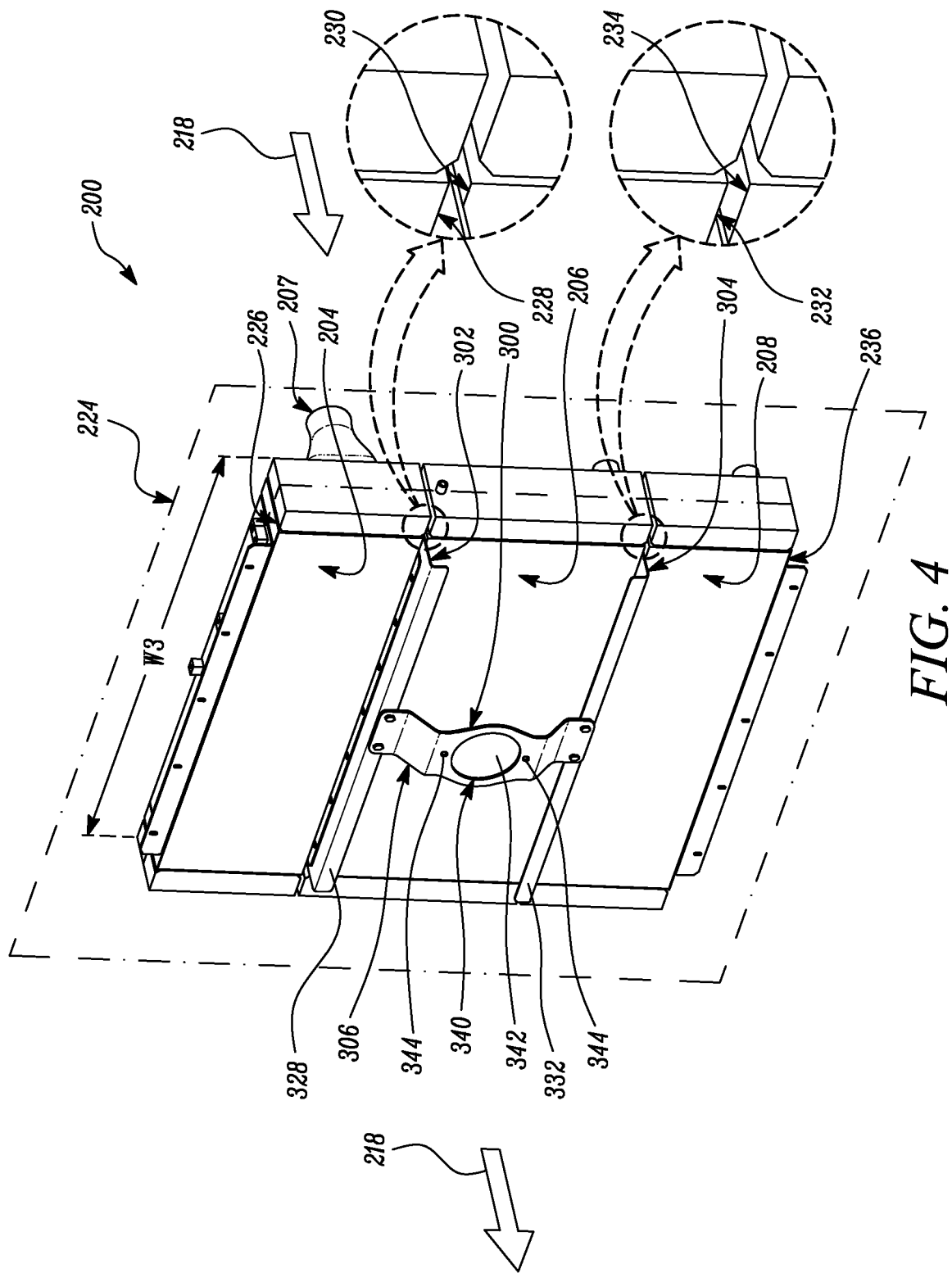
FIG. 4 illustrates an exemplary mounting assembly mounted to cooling cores of the cooling package, in accordance with the concepts of the present disclosure.

Referring to FIGS. 2 and 4, the first cooling core 204, the second cooling core 206 and the third cooling core 208 are stacked together along a plane 224 (shown in FIG. 4). Although, the first cooling core 204, the second cooling core 206 and the third cooling core 208 are shown to be stacked over one another vertically along the plane 224, it may be contemplated that any other stacking configurations may also be implemented to achieve similar results, without deviating from the scope of the claimed subject matter. Each of the first cooling core 204, the second cooling core 206 and the third cooling core 208 includes an upper side and a lower side extending between the inlet header 207 and the outlet header 209. For example, the first cooling core 204 includes an upper side 226 and a lower side 227 extending between the inlet header 207 and the outlet header 209. Similarly, the second cooling core 206 includes an upper side 230 and a lower side 232 extending between the inlet header 207 and the outlet header 209. Furthermore, the third cooling core 208 also includes an upper side 234 and a lower side 236 extending between the inlet header 207 and the outlet header 209.

The shroud 210 is configured to enclose the cooling package 200 and the cooling fan assembly 202. The shroud 210 is configured to direct air through the radiator cooling core, reduce fan noise and provide a safety shield to the cooling package 200, when the cooling fan assembly 202 is operating.

In an embodiment of the present disclosure, the cooling package 200 includes a mounting assembly 300 for mounting the cooling fan assembly 202 within the cooling package 200. The mounting assembly 300 is further explained in greater detail with respect to FIGS. 3 through 6.

Figure 5:
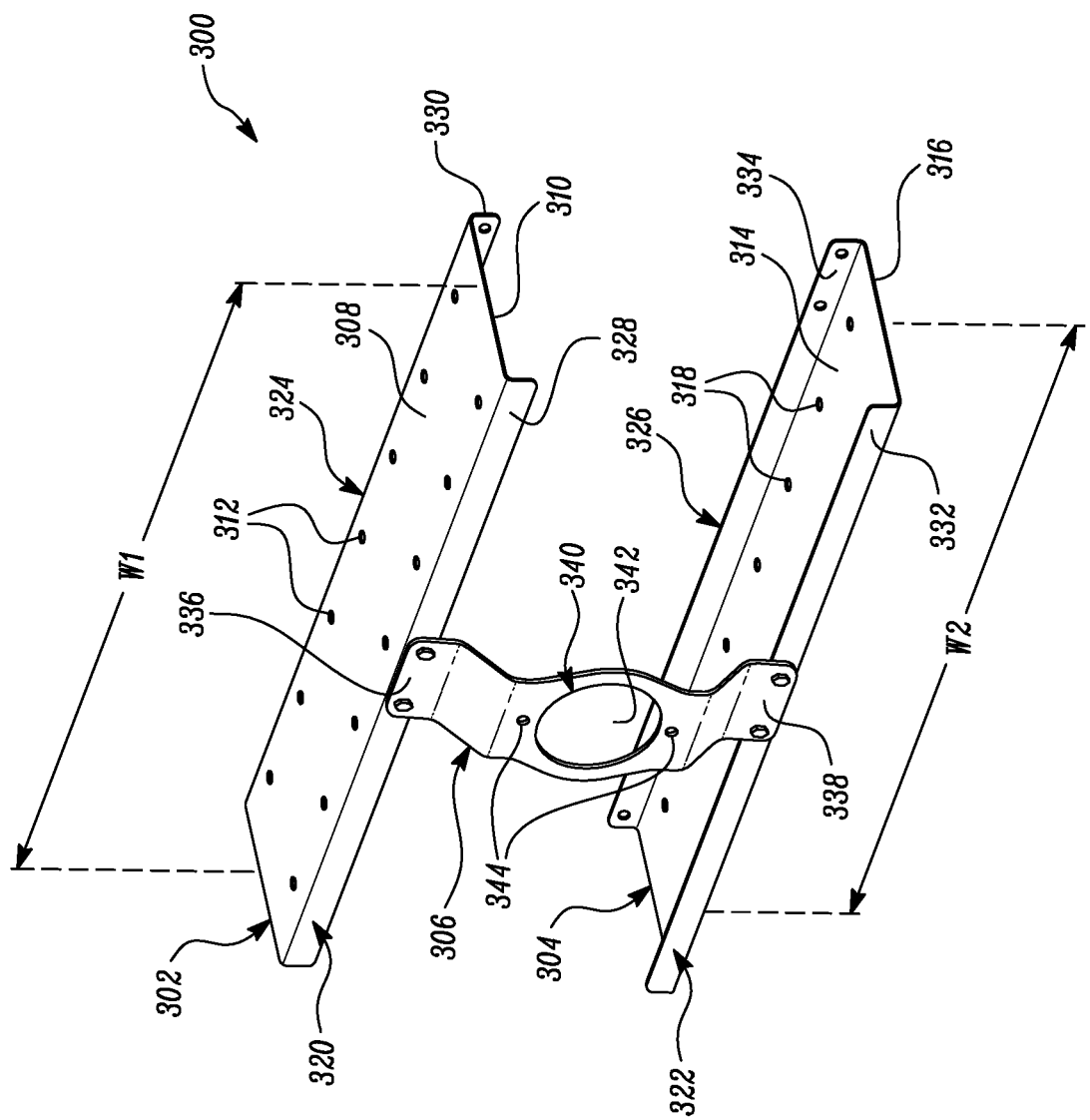
FIG. 5 illustrates a perspective view of the mounting assembly with the cooling cores removed, in accordance with the concepts of the present disclosure.

Referring to FIGS. 4 and 5, an exemplary mounting assembly 300 is shown to be coupled to the cooling cores 204, 206, 208 for mounting the cooling fan assembly 202 within the cooling package 200. As shown in FIGS. 4 and 5, the mounting assembly 300 may include a first mounting plate 302, a second mounting plate 304 and a mounting bracket 306.

The first mounting plate 302 is configured to be positioned and sandwiched between the first cooling core 204 and the second cooling core 206. The first mounting plate 302 includes a first surface, such as an upper surface 308, configured to abut the first cooling core 204 at the lower side 228 of the first cooling core 204. The first mounting plate 302 further includes a second surface, such as a lower surface 310 configured to abut the second cooling core 206 at the upper side 230 of the second cooling core 206 (as shown in FIG. 4). Furthermore, the first mounting plate 302 includes a number of fastening apertures 312 extending between the upper surface 308 and the lower surface 310. The fastening apertures 312 facilitate coupling of the first mounting plate 302 to and between the lower side 228 of the first cooling core 204 and the upper side 230 of the second cooling core 206. For example, one or both of the first cooling core 204 and the second cooling core 206 may include end plates (not shown) attached to the respective upper and lower sides, and the end plates may include fastening apertures (not shown) complimentary to the fastening apertures 312 of the first mounting plate 302, such that the fastening apertures of the end plates may be aligned with the fastening apertures 312 to receive fasteners (not shown) therethrough, to couple the first mounting plate 302 to one or both of the lower side 228 of the first cooling core 204 and the upper side 230 of the second cooling core 206.

The second mounting plate 304 is configured to be positioned and sandwiched between the second cooling core 206 and the third cooling core 208. For example, the second mounting plate 304 includes a first surface, such as an upper surface 314 configured to abut the second cooling core 206 at the lower side 232 of the second cooling core 206. Further the second mounting plate 304 includes a second surface, such as a lower surface 316 configured to abut the third cooling core 208 at the upper side 234 of the third cooling core 208. Similar to the first mounting plate 302, the second mounting plate 304 also includes a number of fastening apertures 318 extending between the upper surface 314 and the lower surface 316 of the second mounting plate 304. The fastening apertures 318 facilitate coupling of the second mounting plate 304 to and between the lower side 232 of the second cooling core 206 and the upper side 234 of the third cooling core 208. For example, one or both of the second cooling core 206 and the third cooling core 208 may include end plates (not shown) attached to the respective upper and lower sides, and the end plates may include fastening apertures (not shown) complimentary to the fastening apertures 318 of the second mounting plate 304, such that the fastening apertures are aligned to receive fasteners therethrough and couple the second mounting plate 304 to one or both of the lower side 232 of the second cooling core 206 and the upper side 234 of the third cooling core 208.

As shown in FIGS. 4 and 5, a width W1 and W2, of the first mounting plate 302 and the second mounting plate 304 respectively, is equal to a width W3 of the cooling cores 204, 206, and 208. However, it may be contemplated that the width W1 and W2 of the mounting plates 302, 304 may be less than the width W3 of the cooling cores 204, 206 and 208. In one example, the width W1 of the first mounting plate 302 may be equal to the width W2 of the second mounting plate 304. In other example, the width W1 of the first mounting plate 302 may be different than the width W2 of the second mounting plate 304.

Furthermore, each of the first mounting plate 302 and the second mounting plate 304 include a downstream side edge 320, 322 and an upstream side edge 324, 326 defined along the direction of flow of air 218 within the cooling package 200. For example, the downstream side edge 320, 322 of the first mounting plate 302 and the second mounting plate 304 are exposed to the downstream side 222 of the cooling package 200. Similarly, the upstream side edge 324, 326 of the first mounting plate 302 and the second mounting plate 304 are exposed to the upstream side 220 of the cooling package 200.

In an exemplary embodiment, as illustrated, the downstream side edge 320 of the first mounting plate 302 may include a first flanged portion 328 extending downward along the plane 224 and towards the second mounting plate 304, and the upstream side edge 324 of the first mounting plate 302 may include a second flanged portion 330 extending downward along the plane 224 and towards the second mounting plate 304. Further, the downstream side edge 322 of the second mounting plate 304 may include a third flanged portion 332 extending upward along the plane 224 and towards the first mounting plate 302 and the upstream side edge 326 may include a fourth flanged portion 334 extending upward along the plane 224 and towards the first mounting plate 302.

In an embodiment of the present disclosure, the mounting bracket 306 is coupled to the first mounting plate 302 and the second mounting plate 304. As shown in FIGS. 4 and 5, the mounting bracket 306 is perpendicularly positioned between and coupled to the downstream side edges 320 and 322 of the first mounting plate 302 and the second mounting plate 304, respectively. For example, the mounting bracket 306 includes an elongated structure extending along the plane 224 and defining a first end 336 and a second end 338. The first end 336 is coupled to the downstream side edge 320 of the first mounting plate 302, whereas, the second end 338 is coupled to the downstream side edge 322 of the second mounting plate 304. In one example, the first end 336 may be coupled to the first flanged portion 328 of the first mounting plate 302 and the second end 338 may be coupled to the third flanged portion 332 of the second mounting plate 304. Alternatively, the first end 336 and the second end 338 of the mounting bracket 306 may be coupled directly to the downstream side edge 320 and 322 of the first mounting plate 302 and the second mounting plate 304, respectively. The mounting bracket 306 may be coupled to the first mounting plate 302 and the second mounting plate 304 using one or more temporary or permanent fastening mechanisms known in the art. In one example, the mounting bracket 306 may be fastened to the first mounting plate 302 and the second mounting plate 304, using nuts and bolts (not shown). In another example, the mounting bracket 306 may be welded to the first mounting plate 302 and the second mounting plate 304.

Figure 6:
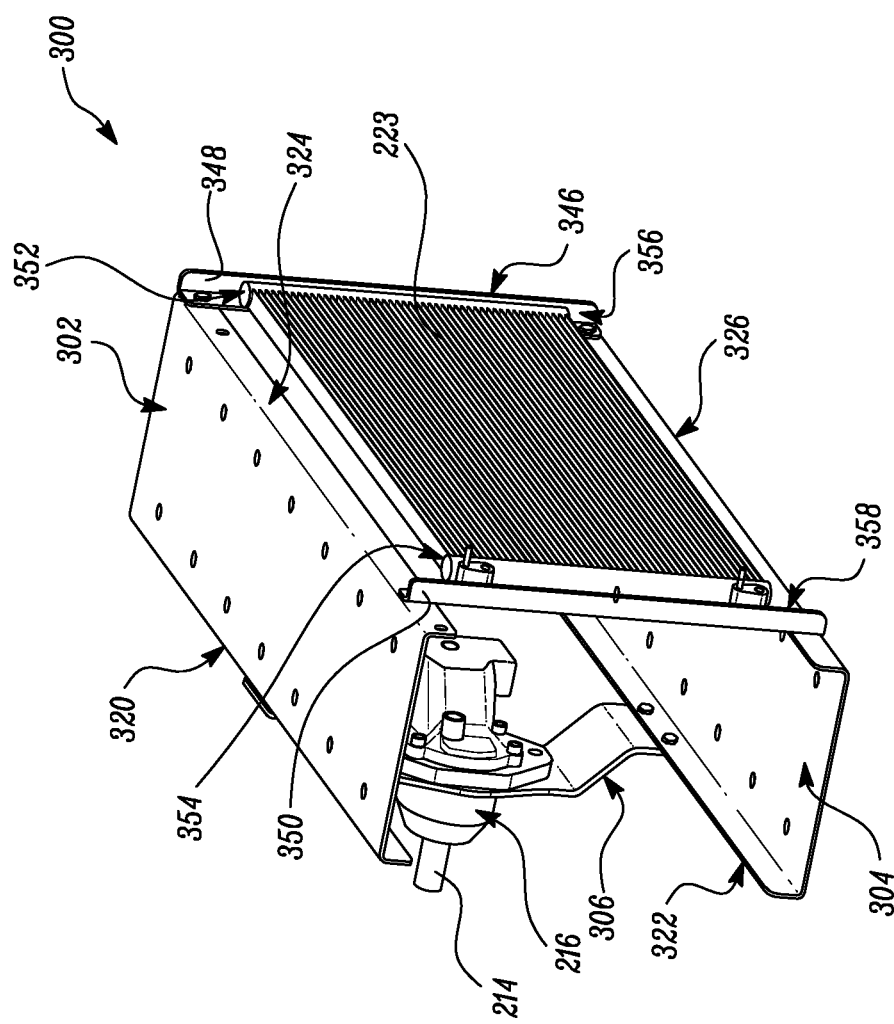
FIG. 6 illustrates a rear perspective view of the mounting assembly with a condenser coupled to the mounting assembly, in accordance with the concepts of the present disclosure.

The mounting bracket 306 includes a mounting member 340 provided between the first end 336 and the second end 338, as shown in FIGS. 4 and 5. The mounting member 340 is configured to receive and releasably couple with the cooling fan assembly 202, thereby coupling the cooling fan assembly 202 within the cooling package 200. In an embodiment of the present disclosure, the mounting member 340 includes a receptacle 342 configured to receive the fan motor 216 (as shown in FIG. 6) of the cooling fan assembly 202 therein. The mounting member 340 also includes a number of fastening elements 344 configured to facilitate fastening of the fan motor 216 to the mounting bracket 306.

In an embodiment, as shown in FIG. 6, the mounting assembly 300 further includes at least one second mounting bracket 346 coupled to the first mounting plate 302 and the second mounting plate 304. For example, the second mounting bracket 346 is coupled to the upstream side edges 324, 326 of the first mounting plate 302 and the second mounting plate 304 and is configured to mount a heat exchanger, such as the condenser 223 within the cooling package 200. As shown, the second mounting bracket 346 includes a first mounting bar 348 and a second mounting bar 350 positioned substantially parallel to one another and perpendicular to the first mounting plate 302 and the second mounting plate 304. Each of the first mounting bar 348 and the second mounting bar 350 includes a top end 352, 354 respectively coupled to the upstream side edge 324 of the first mounting plate 302. Each of the first mounting bar 348 and the second mounting bar 350 further includes a bottom end 356, 358 respectively coupled to the upstream side edge 326 of the second mounting plate 304. Furthermore, each of the first mounting bar 348 and the second mounting bar 350 include one or more fastening mechanisms (not shown) to couple with the condenser 223, thereby coupling the condenser 223 within the cooling package 200.

INDUSTRIAL APPLICABILITY

The mounting assembly 300 according to the embodiments of the present disclosure, provides easy mounting provisions for the cooling fan assembly 202 within the cooling package 200 of the machine 100. As shown in FIG. 2, the mounting assembly 300 facilitates mounting of the cooling fan assembly 202 internally to the shroud 210, thereby making the cooling package 200 compact, robust, and cost effective. Additionally, the mounting assembly 300 also provides provisions for mounting an additional heat exchanger, i.e., the condenser 223, within the cooling package 200.

Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A mounting assembly to mount a cooling fan assembly within a cooling package of a machine, the cooling package including an inlet header, an outlet header, and a cooling core having a first side and a second side extending between the inlet header and the outlet header, the mounting assembly comprising:
    a first mounting plate coupled at the first side of the cooling core;
    a second mounting plate coupled at the second side of the cooling core; and
    a mounting bracket coupled to the first and second mounting plates, wherein the mounting bracket includes a mounting member for releasably coupling the cooling fan assembly within the cooling package.

2. The mounting assembly of claim 1, wherein the cooling core is a first cooling core and the mounting plate is coupled between the first cooling core and a second cooling core stacked together with the first cooling core along a plane.

3. The mounting assembly of claim 1, wherein the second mounting plate is coupled between the second cooling core and a third cooling core of the cooling package, the second cooling core and the third cooling core being stacked together with the first cooling core along the plane.

4. The mounting assembly of claim 2, wherein the mounting plate is coupled to one or both of the first cooling core and the second cooling core, the mounting plate including a plurality of fastening apertures to facilitate coupling of the mounting plate to one or both of the first cooling core and the second cooling core.

5. The mounting assembly of claim 1, wherein the cooling fan assembly facilitates a flow of air through the cooling package, and wherein
    the mounting plate includes an upstream side edge and a downstream side edge defined along a direction of flow of air, and
    the mounting bracket is coupled to the downstream side edge of the mounting plate.

6. The mounting assembly of claim 5, wherein the mounting bracket is a first mounting bracket and the mounting assembly further includes at least one second mounting bracket to be coupled to the upstream side edge of the mounting plate for mounting a heat exchanger within the cooling package.

7. A cooling package for a machine, the cooling package comprising:
    a first cooling core;
    a second cooling core stacked together with the first cooling core along a plane;
    a cooling fan assembly;
    a mounting assembly for mounting the cooling fan assembly within the cooling package, the mounting assembly including:
        a mounting plate coupled between the first cooling core and the second cooling core; and
        a mounting bracket coupled to the mounting plate, wherein the mounting bracket includes a mounting member for releasably coupling the cooling fan assembly within the cooling package.

8. The cooling package of claim 7, wherein the mounting plate is a first mounting plate and the mounting assembly further includes a second mounting plate coupled to the mounting bracket.

9. The cooling package of claim 8 further includes a third cooling core stacked together with the first cooling core and the second cooling core along the plane, wherein the second mounting plate is coupled between the second cooling core and the third cooling core.

10. The cooling package of claim 7, wherein the mounting plate is coupled to one or both of the first cooling core and the second cooling core, the mounting plate including a plurality of fastening apertures to facilitate coupling of the mounting plate to one or both of the first cooling core and the second cooling core.

11. The cooling package of claim 7, wherein the cooling fan assembly facilitates a flow of air through the cooling package, and wherein
    the mounting plate includes an upstream side edge and a downstream side edge defined along a direction of flow of air, and
    the mounting bracket is coupled to the downstream side edge of the mounting plate.

12. The cooling package of claim 8, wherein the mounting bracket is a first mounting bracket and the mounting assembly further includes at least one second mounting bracket coupled to the upstream side edge of the mounting plate for mounting a heat exchanger within the cooling package.

13. A machine comprising:
    an engine;
    a cooling package associated with the engine, the cooling package including:
        a first cooling core;
        a second cooling core;
        a third cooling core stacked together with the first cooling core and the second cooling core along a plane;
        a cooling fan assembly;
        a mounting assembly for mounting the cooling fan assembly within the cooling package, the mounting assembly including:
            a first mounting plate coupled between the first cooling core and the second cooling core;
            a second mounting plate coupled between the second cooling core and the third cooling core; and
            a mounting bracket coupled to the first mounting plate and the second mounting plate, wherein the mounting bracket includes a mounting member to releasably couple the cooling fan assembly within the cooling package.

14. The machine of claim 13, wherein the cooling fan assembly facilitates a flow of air through the cooling package, and wherein each of the first mounting plate and the second mounting plate includes an upstream side edge and a downstream side edge defined along a direction of flow of air, and the mounting bracket is coupled to the downstream side edge of each of the first mounting plate and the second mounting plate.

15. The machine of claim 14, wherein the mounting bracket is a first mounting bracket and the mounting assembly further includes at least one second mounting bracket coupled to the upstream side edge of each of the first mounting plate and the second mounting plate for mounting a heat exchanger within the cooling package.

\* \* \* \* \*